United States Patent
Gupta et al.

(10) Patent No.: US 9,523,048 B2
(45) Date of Patent: Dec. 20, 2016

(54) PRE-SULFIDING AND PRE-CONDITIONING OF RESIDUUM HYDROCONVERSION CATALYSTS FOR EBULLATED-BED HYDROCONVERSION PROCESSES

(75) Inventors: Avinash Gupta, Bloomfield, NJ (US); Mario C. Baldassari, Morris Plains, NJ (US); Ujjal K. Mukherjee, Montclair, NJ (US)

(73) Assignee: Lummus Technology Inc., Bloomfield, NJ (US)

( * ) Notice: Subject to any disclaimer, the term of this patent is extended or adjusted under 35 U.S.C. 154(b) by 2097 days.

(21) Appl. No.: 12/509,252

(22) Filed: Jul. 24, 2009

(65) Prior Publication Data

US 2011/0017641 A1 Jan. 27, 2011

(51) Int. Cl.
*C10G 65/12* (2006.01)
*C10G 47/06* (2006.01)
*B01J 37/20* (2006.01)

(52) U.S. Cl.
CPC ............... *C10G 65/12* (2013.01); *B01J 37/20* (2013.01); *C10G 47/06* (2013.01);
(Continued)

(58) Field of Classification Search
USPC .................... 208/88, 89, 111.3, 111.35, 212, 213,208/216 R, 217
See application file for complete search history.

(56) References Cited

U.S. PATENT DOCUMENTS 4,089,930 A 5/1978 Kittrell et al.
4,177,136 A 12/1979 Herrington et al.
(Continued)

FOREIGN PATENT DOCUMENTS

EP 0122180 A1 10/1984
JP 2005213384 A 8/2005
(Continued)

OTHER PUBLICATIONS

International Search Report and Written Opinion issued Feb. 28, 2011 in corresponding International Patent application No. PCT/US2010/041272 (8 pages).
(Continued)

*Primary Examiner* — Renee E Robinson
(74) *Attorney, Agent, or Firm* — Osha • Liang LLP

(57) ABSTRACT

A hydroconversion process is disclosed, including contacting of hydrogen and a residuum hydrocarbon with a pre-conditioned and at least partially sulfided hydroconversion catalyst for converting at least a portion of the residuum hydrocarbon into at least one of a hydrotreated product and a hydrocracked product. Pre-sulfiding and pre-conditioning of the catalyst may include: intermittently or continuously: feeding a hydroconversion catalyst comprising a metal oxide to a pre-reactor; feeding hydrogen and the residuum hydrocarbon comprising sulfur-containing compounds to the pre-reactor; contacting the hydroconversion catalyst with hydrogen and the sulfur-containing compounds in the pre-reactor at conditions of temperature and pressure to concurrently: i) convert at least a portion of the metal oxide to a metal sulfide; and ii) pre-condition the catalyst; recovering a residuum hydrocarbon having a reduced sulfur content from the pre-reactor; and transporting the pre-conditioned and at least partially sulfided hydroconversion catalyst from the pre-reactor to the ebullated-bed hydroconversion reactor.

12 Claims, 3 Drawing Sheets

(52) U.S. Cl.
CPC .......... C10G 2300/107 (2013.01); C10G 2300/1074 (2013.01); C10G 2300/1077 (2013.01); C10G 2300/202 (2013.01); C10G 2300/703 (2013.01)

(56) References Cited

U.S. PATENT DOCUMENTS

| | | | |
|---|---|---|---|
| 4,443,330 | A | 4/1984 | Nongbri |
| 4,530,917 | A | 7/1985 | Berrebi |
| 4,943,547 | A | 7/1990 | Seamans et al. |
| 6,291,391 | B1 | 9/2001 | MacArthur |
| 7,513,990 | B2 | 4/2009 | Guillaume et al. |
| 2008/0135449 | A1* | 6/2008 | Bhan et al. ............ 208/85 |

FOREIGN PATENT DOCUMENTS

| | | |
|---|---|---|
| WO | 0197971 A1 | 12/2001 |
| WO | 02100541 A1 | 12/2002 |

OTHER PUBLICATIONS

Patent Examination Report No. 1 issued Aug. 9, 2012 in corresponding Australian patent application 2010274166 (3 pages).
Office Action issued Aug. 7, 2012 in corresponding Canadian appication No. 2,750,334 (2 pages).
Extended European Search Report issued in corresponding European Application No. 10802652.7 dated Feb. 1, 2013 (8 pages).
Daniel J. Neuman et al. "Xpress: The First True Ex-Situ Pre-Sulfiding Process", National Petroleum Refiners Association Annual Meeting, Mar. 17, 1998 (16 pages).
S.K. Maity et al. Alumina Titania Binary Mixed Oxide Used As Support of Catalysts for Hydrotreating maya Heavy Crude:, Applied Catalysts A: General, vol. 244, Dec. 31, 2003, pp. 141-153.
Hui Ge et al. "Highly Active Mo/Al2O3 Hydrodesulfurization Catalyst Presulfided with Ammonium Thiosulfate", vol. 9, Jul. 17, 2008, pp. 2578-2582.
Examination Report issued in corresponding Australian Application No. 2010274166 dated Mar. 28, 2013 (4 pages).
Written Opinion issued in corresponding Singaporean Application No. 201106481-3 dated May 13, 2013 (10 pages).
Office Action issued in corresponding Japanese Application No. 2005213384 dated Aug. 6, 2013 with English Reporting thereof (5 pages).
Official Action issued in corresponding Mexican Application No. MX/a/2011/008743 with English reporting thereof lated Jul. 8, 2013 (6 pages).
Office Action issued in corresponding Korean Application No. 10-2012-7001366 with English translation dated Jun. 4, 2013 (8 pages).
Office Action issued in corresponding Canadian Application No. 2,750,334 dated Aug. 2, 2013 (3 pages).
Official Decision issued in corresponding Egyptian Application No. PCT110/2012 with English reporting thereof (7 pages).
Official Action issued in corresponding Mexican Application No. MX/a/2011/008743 with English reporting thereof lated Oct. 17, 2013 (6 pages).
Office Action issued in corresponding Vietnamese Application No. 1-2011-02211 dated Nov. 29, 2013 (3 pages).
Notice of Allowance issued in corresponding Japanese Application No. 2012-521666 with English Translation dated Nov. 22, 2013 (4 pages).
Official Action issued in corresponding Eurasian Application No. 201171058/31 with English Translation dated Oct. 31, 2013 (4 pages).
Office Action issued in corresponding Korean Application No. 10-2012-7001366 with English Translation dated Dec. 26, 2013 (8 pages).
Official Action issued in corresponding Mexican Application No. MX/a/2011/008743 with English reporting thereof fated Apr. 8, 2014 (6 pages).
Examination Report issued in corresponding Indian Application No. 5216/DELNP/2011 dated May 22, 2015 (3 pages).

* cited by examiner

PRE-SULFIDING AND PRE-CONDITIONING OF RESIDUUM HYDROCONVERSION CATALYSTS FOR EBULLATED-BED HYDROCONVERSION PROCESSES

FIELD OF THE DISCLOSURE

Embodiments disclosed herein relate generally to hydroconversion processes. In other aspects, embodiments disclosed herein relate to concurrent pre-sulfiding and pre-conditioning of hydroconversion catalysts for use in hydroconversion processes.

BACKGROUND

Hydroconversion reactions, including hydrotreating and hydrocracking, may be used to upgrade a hydrocarbon feedstock by increasing its hydrogen content, removing various heteroatom contaminants, and/or converting longer-chain hydrocarbon molecules into shorter-chain hydrocarbon molecules. A hydroconversion catalyst is typically used to catalyze one or more hydroconversion reactions between hydrogen and the hydrocarbon feedstock.

The performance of a hydroconversion reaction, including the reaction rates, the hydrocarbon conversion and the formation of undesirable byproducts, depends to a great extent upon the activity and selectivity of the hydroconversion catalyst. For example, a fresh catalyst may support high reaction rates and high hydrocarbon conversion. However, over time, the activity of the hydroconversion catalyst may decrease due to various coking mechanisms, including carbon laydown, pore mouth plugging, and loss of interstitial pore volume.

Fresh hydroconversion catalyst is especially prone to excessive coking when subjected to a high-severity environment, including high temperature, high pressure, and a hydrocarbon feed having a high concentration of sulfur. For example, a fresh unconditioned/un-presulfided hydroconversion catalyst may loose as much as half of its activity or more when it is sulfided in the high severity environment existing in the hydroconversion reactor. Under such conditions the unsulfided catalyst is subjected to a thermal shock. Such premature deactivation of the fresh hydroconversion catalyst may cause reduced hydrocarbon conversion and require more frequent catalyst change-outs and/or regenerations. Accordingly, various pre-treatment methods, including pre-sulfiding and/or preconditioning, are used to mitigate the effects of thermal shock on a hydroconversion catalyst.

The benefits of catalyst presulfiding in general are well known in the prior art. For example, the use of high boiling oils, such as vacuum gas oils, and hydrocarbon solvents to aid the incorporation of elemental sulfur into a catalyst is disclosed in U.S. Pat. No. 4,943,547. U.S. Pat. No. 4,530,917 discloses a method of presulfurizing a hydrotreating catalyst with organic polysulfides.

U.S. Pat. No. 4,177,136 discloses a method of catalyst presulfurizing wherein a catalyst is treated with elemental sulfur. Hydrogen is then used as a reducing agent to convert the elemental sulfur to hydrogen sulfide in situ. U.S. Pat. No. 4,089,930 also discloses the pretreatment of a catalyst with elemental sulfur in the presence of hydrogen. U.S. Pat. No. 6,291,391 discloses a process for pre-sulfiding using a hydrogen-sulfide containing gas and subsequently pre-conditioning the catalyst with a liquid hydrocarbon conditioning oil.

U.S. Pat. No. 4,443,330 discloses a process for maintaining activity of a catalyst during use in coal liquid upgrading process. An added sulfur-containing liquid is added to the reactor to stabilize and maintain the sulfur level in the reactor.

Each of the aforementioned processes for presulfiding a hydroconversion catalyst requires one or more of use of added noxious and/or toxic sulfur-containing compounds, equipment for the storage, feeding, and/or separation of said sulfur-containing compounds or elemental sulfur, additional hydrocarbons and/or solvents used during the pre-sulfiding of the catalyst, and other components or chemicals that add to the capital and operating expenses associated with hydroconversion processes.

Accordingly, there exists a need for efficient and compatible methods of pre-treating a hydroconversion catalyst.

SUMMARY OF THE DISCLOSURE

In one aspect, embodiments disclosed herein relate to a hydroconversion process, including: feeding hydrogen and a residuum hydrocarbon comprising sulfur-containing hydrocarbons to an ebullated-bed hydroconversion reactor; contacting the hydrogen and the residuum hydrocarbon with a pre-conditioned and at least partially sulfided hydroconversion catalyst for converting at least a portion of the residuum hydrocarbon into at least one of a hydrotreated product and a hydrocracked product; and intermittently or continuously: feeding a hydroconversion catalyst comprising a metal oxide to a pre-reactor; feeding hydrogen and the residuum hydrocarbon comprising sulfur-containing compounds to the pre-reactor; contacting the hydroconversion catalyst with the hydrogen and the sulfur-containing compounds in the pre-reactor at conditions of temperature and pressure to concurrently: i) convert at least a portion of the metal oxide to a metal sulfide; and ii) pre-condition the catalyst; recovering a residuum hydrocarbon having a reduced sulfur content from the pre-reactor; and transporting the pre-conditioned and at least partially sulfided hydroconversion catalyst from the pre-reactor to the ebullated-bed hydroconversion reactor.

Other aspects and advantages will be apparent from the following description and the appended claims.

DETAILED DESCRIPTION

Figure 1:
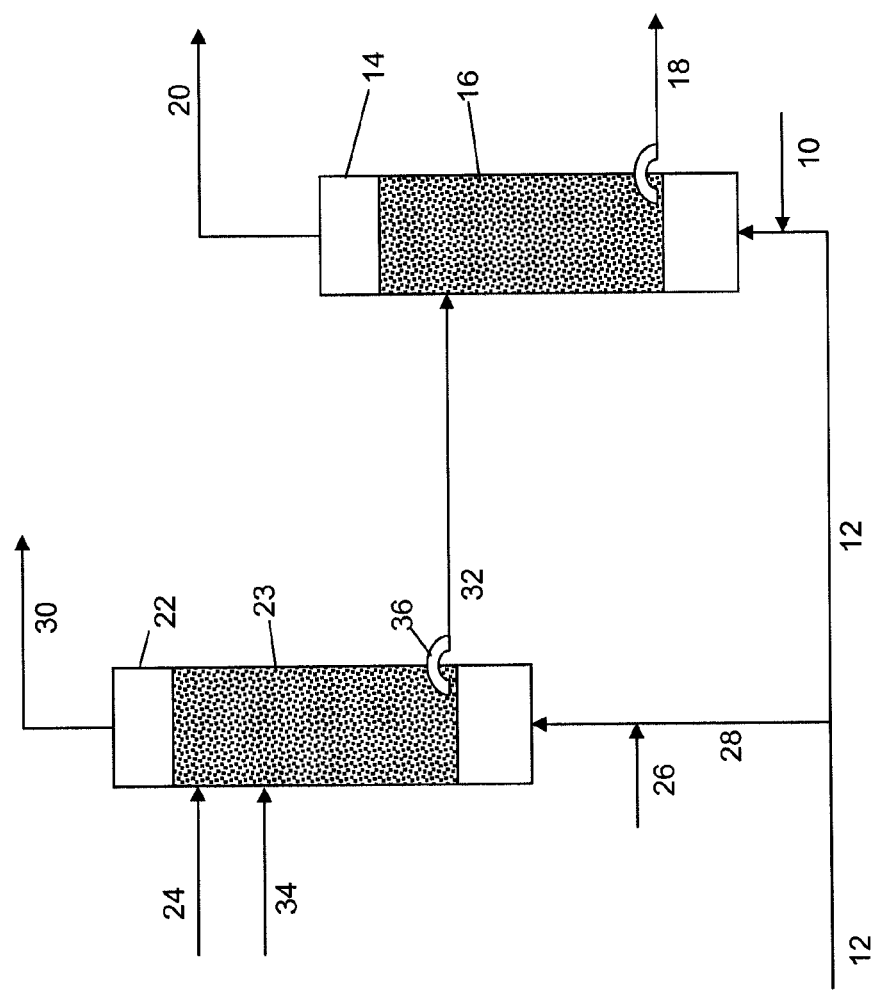
FIG. 1 is a simplified process flow diagram of hydroconversion processes according to embodiments disclosed herein including the concurrent pre-sulfiding and pre-conditioning of the hydroconversion catalysts.

In one aspect, embodiments disclosed herein relate generally to hydroconversion processes. In other aspects, embodiments disclosed herein relate to concurrent pre-sulfiding and pre-conditioning of hydroconversion catalysts for use in hydro conversion processes.

Hydroconversion processes disclosed herein may be used for reacting residuum hydrocarbon feedstocks at conditions of elevated temperatures and pressures in the presence of hydrogen and a hydroconversion catalyst to convert the feedstock to lower molecular weight products with reduced contaminant (such as sulfur and/or nitrogen) levels. Hydroconversion processes may include, for example, hydrogenation, desulfurization, denitrogenation, cracking, conversion, and removal of metals, Conradson Carbon or asphaltenes, etc.

Residuum hydrocarbon feedstocks useful in embodiments disclosed herein are those having at least some sulfur-containing compounds present in the feedstock as supplied to the hydroconversion process. While additional sulfur-containing compounds may be added, if desired, the addition of such is not necessary for embodiments disclosed herein. Residuum hydrocarbon feedstocks useful in embodiments disclosed herein may include various refinery and other hydrocarbon streams which include at least some sulfur-containing compounds. For example, residuum hydrocarbon feedstocks may include petroleum atmospheric or vacuum residue, deasphalted oil, deasphalter pitch, hydrocracked atmospheric tower or vacuum tower bottom, straight run vacuum gas oil, hydrocracked vacuum gas oil, fluid catalytically cracked (FCC) slurry oils, vacuum gas oil from an ebullated bed process, as well as other similar hydrocarbon streams, and a combination of these, each of which may be straight run, process derived, hydrocracked, partially desulfurized, and/or low-metal streams.

In addition to residuum hydrocarbon feedstocks mentioned above, hydroconversion reactor effluents (i.e., process derived) having at least some sulfur-containing compounds may also be used for concurrent pre-sulfiding and pre-conditioning of hydroconversion catalysts according to embodiments disclosed herein, and these are also considered residuum hydrocarbon feedstocks for embodiments disclosed herein. Using residuum hydrocarbons including sulfur-containing compounds for concurrent pre-sulfiding and pre-conditioning a hydroconversion catalyst may be more compatible with the particular type of hydroconversion reaction the catalyst is designated for, and may, therefore, improve the catalyst activity, including higher residuum hydrocarbon conversion and reduced coking rates.

Hydroconversion catalysts are defined herein as a catalyst that may be used for the hydrotreating or hydrocracking of a hydrocarbon feedstock. A hydrotreating catalyst, for example, may include any catalyst composition that may be used to catalyze the hydrogenation of hydrocarbon feedstocks to increase its hydrogen content and/or remove heteroatom contaminants. A hydrocracking catalyst, for example, may include any catalyst composition that may be used to catalyze the addition of hydrogen to large or complex hydrocarbon molecules as well as the cracking of the molecules to obtain smaller, lower molecular weight molecules.

Hydroconversion catalyst compositions for use in the hydroconversion process according to embodiments disclosed herein are well known to those skilled in the art and several are commercially available from W.R. Grace & Co., Criterion Catalysts & Technologies, and Akzo Nobel, among others. Suitable hydroconversion catalysts may include one or more elements selected from Groups 4-12 of the Periodic Table of the Elements. In some embodiments, hydroconversion catalysts according to embodiments disclosed herein may comprise, consist of, or consist essentially of one or more of nickel, cobalt, tungsten, molybdenum and combinations thereof, either unsupported or supported on a porous substrate such as silica, alumina, titania, or combinations thereof. As supplied from a manufacturer or as resulting from a regeneration process, the hydroconversion catalysts may be in the form of metal oxides, for example.

Prior to use in a hydroconversion reactor, such hydroconversion catalysts may be pre-sulfided and pre-conditioned according to embodiments disclosed herein, as will be described in detail below. Pre-sulfiding and pre-conditioning may convert at least a portion of the metal oxides to their passive sulfide form and preserve the catalyst activity by reducing the susceptibility of the catalyst to rapid deactivation and carbon deposits otherwise formed during high temperature hydroconversion reactor operating conditions.

Pre-conditioning of the catalyst, for example, may produce a lower level of carbon coke deposit on the hydroconversion catalyst particles. This lower level carbon coke deposit layer may protect the catalyst from thermal shock by providing an insulating effect, and may further prevent or significantly reduce additional coking of the catalyst that may otherwise be experienced inside a hydroconversion reactor at typical hydroconversion reaction conditions.

Pre-sulfiding of the catalyst may convert, in some embodiments, 30 mole % or more of the metal oxides to metal sulfides; 40 mole % or more in other embodiments; 50 mole % or more in other embodiments; 60 mole % or more in other embodiments; 70 mole % or more in other embodiments; and 80 mole % or more in yet other embodiments. The amount of sulfur required for conversion of the metal oxides to metal sulfides may depend on the desired degree of sulfiding, the metal content of the catalyst; and other factors as may be known to one skilled in the art.

In hydroconversion processes according to embodiments disclosed herein, hydrogen and a residuum hydrocarbon may be fed to a reactor, such as a fluidized or ebullated-bed hydroconversion reactor. In the hydroconversion reactor, the hydrogen and residuum hydrocarbon may be contacted in the presence of a pre-conditioned and at least partially sulfided hydroconversion catalyst, as will be described later, for converting at least a portion of the residuum hydrocarbon into at least one of a hydrotreated product and a hydrocracked product. During the hydroconversion process, the hydroconversion catalysts may become spent, such as due to metals and carbon deposition, for example. Spent catalyst may be continuously or intermittently removed from the ebullated-bed hydroconversion reactor and may continuously or intermittently be replaced with fresh or regenerated catalyst which has been pre-sulfided and preconditioned, thus avoiding the direct introduction of fresh or regenerated catalyst into a hydroconversion reactor.

The pre-sulfiding and pre-conditioning of hydroconversion catalysts according to embodiments disclosed herein may be conducted in a pre-reactor fluidly connected to the hydroconversion reactor. Pre-sulfiding and pre-conditioning of hydroconversion catalysts may be conducted concurrently, in a continuous, semi-continuous, or batch mode, to convert at least a portion of the metal oxides to their passive sulfide form and to preserve the catalyst activity, as noted above.

The pre-sulfided and pre-conditioned hydroconversion catalyst may then be transported from the pre-reactor to the hydroconversion reactor, either continuously or intermittently, without causing any process interruptions for the hydroconversion reactor. For example, the pre-reactor, its feed and effluent lines, and auxiliary equipment may be isolated, without disturbing the hydroconversion reactor operations, such that pre-sulfided and pre-conditioned hydroconversion catalysts prepared according to embodiments disclosed herein may be supplied to the ebullated-bed hydroconversion reactor, either intermittently or continuously, without interruption of the hydroconversion reaction.

Concurrent pre-sulfiding and pre-conditioning may be performed according to embodiments disclosed herein by contacting a fresh or regenerated hydroconversion with a residuum hydrocarbon feedstock in a pre-reactor. For example, a fresh or regenerated hydroconversion catalyst may be contacted with a sulfur-containing residuum hydrocarbon feedstock at a lower operating severity than used in the hydroconversion reactor in order to expose the catalyst to the hydrocarbon feedstock, suppress excessive carbon/metal depositions on the catalyst, and at least partially sulfide the catalyst. Use of a hydrocarbon liquid associated with or derived from the hydroconversion process may result in a better pre-conditioning of the catalyst than when an external feed or a specialized fluid is used, as typically required by prior art processes.

Once the hydroconversion catalyst is pre-sulfided and pre-conditioned, it may be transported to the hydroconversion reactor for catalyzing at least one of a hydrotreating reaction and a hydrocracking reaction of a resid. In some embodiments, a transfer medium, such as an inert gas or a hydrocarbon, may be used to transfer the catalyst. In some embodiments, the residuum hydrocarbon may be used for both pre-sulfiding and pre-conditioning of the catalyst as well as for transfer of the catalyst from the pre-reactor to the hydroconversion reactor. This may significantly reduce any potential swings or upsets in the hydroconversion reactor that may otherwise occur.

Pre-reactor operating conditions may depend on the residuum hydrocarbon feedstock used, the hydroconversion catalyst, the specific hydroconversion process, and the degree of pre-sulfiding and pre-conditioning desired, among other factors. As noted above, pre-reactor conditions may be less severe than the hydroconversion reactor conditions. In some embodiments, temperatures in the pre-reactor may be in a range from about 230° C. to about 450° C.; from about 260° C. to about 430° C. in other embodiments; and from about 300° C. to about 400° C. in yet other embodiments. Pressures in the pre-reactor may range from about 1 bar absolute to about 200 bar absolute in some embodiments; from about 2 bar absolute to about 150 bar absolute in other embodiments; and from about 2 bar absolute to about 80 bar absolute in yet other embodiments.

Referring now to FIG. 1, a simplified process flow diagram of hydroconversion processes according to embodiments disclosed herein, including the concurrent pre-sulfiding and pre-conditioning of hydroconversion catalysts, is illustrated. Pumps, valves, heat exchangers, and other equipment are not shown for ease of illustration of embodiments disclosed herein. Hydrogen and a residuum hydrocarbon may be fed via flow lines 10 and 12, respectively, to a hydroconversion reactor 14 for hydrotreating or hydrocracking of the residuum hydrocarbon. Hydroconversion reactor 14 may be a fluidized bed, ebullated-bed, or similar type reactor allowing the withdrawal of spent catalyst and the introduction of pre-conditioned and pre-sulfided hydroconversion catalyst. In hydroconversion reactor 14, the hydrogen and residuum hydrocarbon may be contacted in the presence of a pre-conditioned and at least partially sulfided hydroconversion catalyst in bed 16, for converting at least a portion of the residuum hydrocarbon into at least one of a hydrotreated product and a hydrocracked product, which may be recovered via flow line 20.

During operation of the hydroconversion process, the hydroconversion catalysts may become spent, such as due to metals or carbon deposition, for example. Spent catalyst may be continuously or intermittently removed from hydroconversion reactor 14 via flow line 18 and may continuously or intermittently be replaced with fresh or regenerated catalyst that has been pre-sulfided and pre-conditioned, thus avoiding the direct introduction of fresh or regenerated catalyst into hydroconversion reactor 14.

Pre-sulfiding and pre-conditioning of the hydroconversion catalyst may be performed in pre-reactor 22, as necessary for replenishment of the hydroconversion catalyst in hydroconversion reactor 14. Fresh or regenerated hydroconversion catalyst may be fed to bed 23 of pre-reactor 22 via flow line 24, and may be fed in continuously, semi-continuously, or batchwise. Hydrogen and a slipstream of the residuum hydrocarbon may be fed via flow lines 26 and 28, respectively, to pre-reactor 22. The hydrogen fed to pre-reactor 22 may be neat or diluted with various gases, such as a hydrogen rich recycle gas recovered downstream of the hydroconversion reactor or from a variety of sources as may be found in a petrochemical facility.

In pre-reactor 22, the hydroconversion catalyst may be contacted at conditions of temperature and pressure sufficient to convert at least a portion of the metal oxides in the catalyst to metal sulfides and to pre-condition the catalyst for contact with the residuum hydrocarbon at the severe hydroconversion reactor 14 operating conditions. An effluent from the pre-reactor may be recovered via flow line 30, where the effluent has a reduced sulfur content as compared to the residuum hydrocarbon fed via flow line 28.

Pre-sulfided and pre-conditioned hydroconversion catalyst may be, continuously or intermittently, withdrawn and transferred from pre-reactor 22 to hydroconversion reactor 14 via flow line 32. To effect the transfer, appropriate manipulation of flow valves may be performed, and a transfer fluid, such as an inert gas or the residuum hydrocarbon may be fed via flow line 34, fluidizing or suspending the pre-sulfided and pre-conditioned catalyst and transporting the catalyst from pre-reactor 22 via outlet 36.

Figure 2:
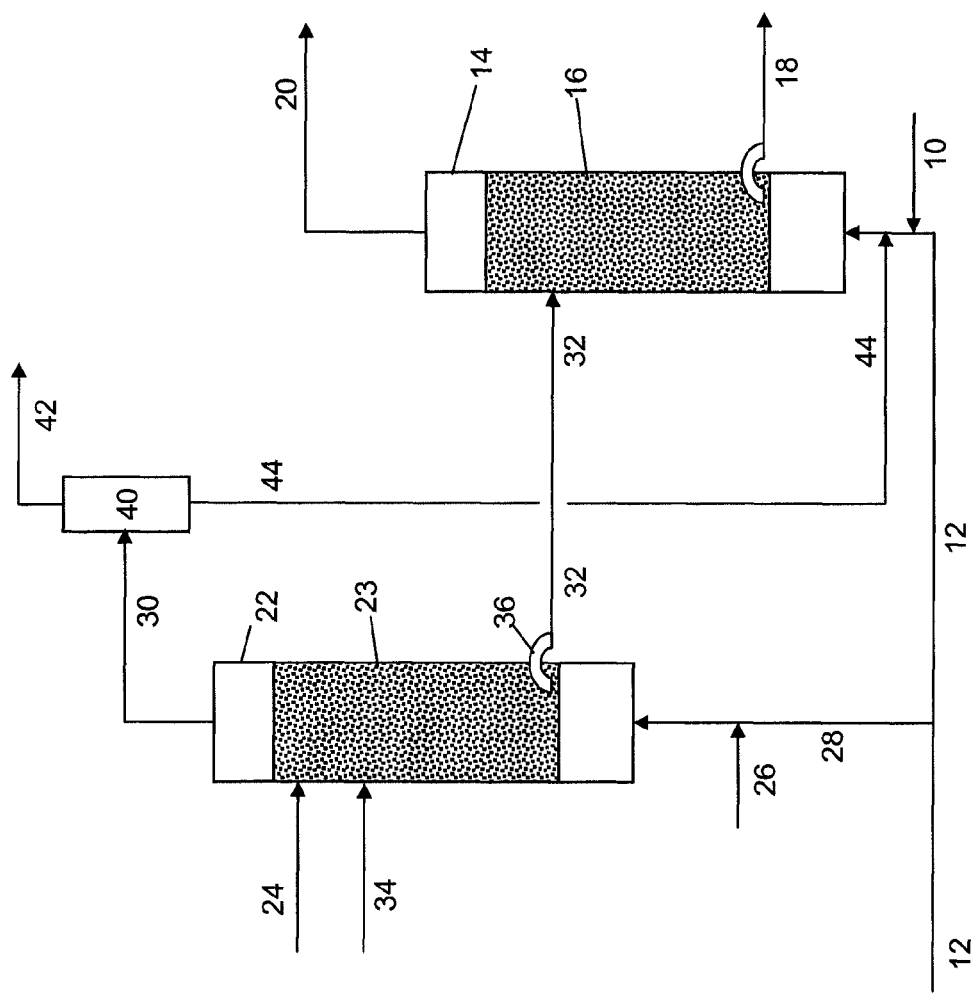
FIG. 2 is a simplified process flow diagram of hydroconversion processes according to embodiments disclosed herein including the concurrent pre-sulfiding and pre-conditioning of the hydroconversion catalysts.

Referring now to FIG. 2, a simplified process flow diagram of hydroconversion processes according to embodiments disclosed herein, including the concurrent pre-sulfiding and pre-conditioning of hydroconversion catalysts, is illustrated, where like numerals represent like parts. In this embodiment, the effluent from pre-reactor 22 is fed via flow line 30 to separator 40 for separation of unreacted hydrogen and/or gases co-fed with the hydrogen from the residuum hydrocarbon. Separator 40 may include any type of separator useful for the separation of liquids and gases, including membrane separators, flash vessels, distillation columns, and the like.

As illustrated, the gases may be recovered from separator 40 via flow line 42. If necessary or desired, the residuum hydrocarbon recovered from separator 40 may be fed via flow line 44 for further processing in hydroconversion reactor 14.

Figure 3:
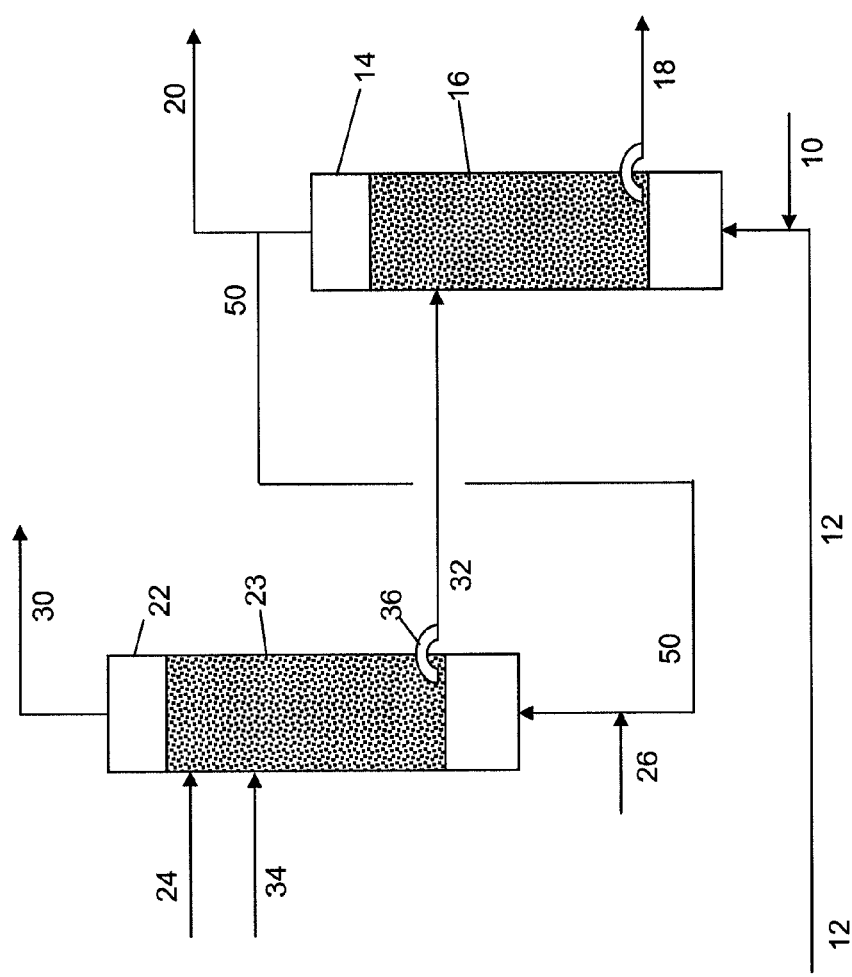
FIG. 3 is a simplified process flow diagram of hydroconversion processes according to embodiments disclosed herein including the concurrent pre-sulfiding and pre-conditioning of the hydroconversion catalysts.

Referring now to FIG. 3, a simplified process flow diagram of hydroconversion processes according to embodiments disclosed herein, including the concurrent pre-sulfiding and pre-conditioning of hydroconversion catalysts, is illustrated, where like numerals represent like parts. In this embodiment, a portion of the effluent from hydroconversion reactor 14 is fed via flow line 50 for pre-conditioning and pre-sulfiding the hydroconversion catalyst. In this embodiment, the effluent from hydroconversion reactor 14 contains at least some sulfur-containing compounds for the pre-sulfiding.

As described above, embodiments disclosed herein provide for the concurrent pre-sulfiding and pre-conditioning of hydroconversion catalysts. Advantageously, embodiments disclosed herein may provide for one or more of the following.

Pre-conditioning and pre-sulfiding of hydroconversion catalysts according to embodiments disclosed herein may provide for increased catalyst activity and catalyst cycle time due to a decrease in carbon deposition typically resulting from thermal shock when fed, un-treated, to a hydroconversion reactor. Increased activity and cycle time may also result in increased catalyst life span, as less frequent regenerations may be required. Pre-conditioning of catalysts according to embodiments disclosed herein may be more effective as compared to prior art processes as hydrocarbon feedstocks similar or identical to that contacted in the hydroconversion reactor, at more severe conditions, is used for the pre-sulfiding and pre-conditioning.

Processes disclosed herein may require less capital cost and operating expense due to the absence of added sulfur compounds, reducing raw material costs and equipment piece count as compared to prior art processes. Process safety may additionally be improved by not using an added sulfur-containing compound. By not requiring added sulfur-containing compounds, as typically required in prior art processes, process according to embodiments disclosed herein may advantageously not require additional storage tanks, transfer piping and pumps, and other equipment that would necessarily result from use of the added sulfur-containing compounds. Further, the toxicity and noxious odors commonly associated with added sulfur-containing compounds may be avoided.

Processes disclosed herein may result in improved hydroconversion reactor performance by pre-sulfiding and pre-conditioning the catalyst, as described above. Embodiments disclosed herein may provide for the continuous or intermittent transfer of pre-sulfided and pre-conditioned catalyst to the hydroconversion reactor, providing for essentially no interruption in the operation of the hydroconversion reactor. Use of a residuum hydrocarbon for catalyst transfer, as opposed to various other transfer media disclosed in the prior art, may additionally provide for limited or no upsets of hydroconversion reactor operations.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A hydroconversion process, comprising:
    feeding hydrogen and a residuum hydrocarbon comprising sulfur-containing hydrocarbons to an ebullated-bed hydroconversion reactor;
    contacting the hydrogen and the residuum hydrocarbon with a pre-conditioned and at least partially sulfided hydroconversion catalyst for converting at least a portion of the residuum hydrocarbon into at least one of a hydrotreated product and a hydrocracked product; and
    intermittently or continuously:
        feeding a hydroconversion catalyst comprising a metal oxide to a pre-reactor;
        feeding hydrogen and the residuum hydrocarbon comprising sulfur-containing compounds to the pre-reactor;
        contacting the hydroconversion catalyst with the hydrogen and the sulfur-containing compounds in the pre-reactor at conditions of temperature and pressure to concurrently:
            i) convert at least a portion of the metal oxide to a metal sulfide; and
            ii) pre-condition the catalyst;
        recovering a residuum hydrocarbon having a reduced sulfur content from the pre-reactor;
        transporting the pre-conditioned and at least partially sulfided hydroconversion catalyst from the pre-reactor to the ebullated-bed hydroconversion reactor;
        feeding the residuum hydrocarbon having a reduced sulfur content to the ebullated-bed hydroconversion reactor; and
        separating the residuum hydrocarbon having a reduced sulfur content recovered from the pre-reactor to recover a vapor fraction comprising at least one of unreacted hydrogen and gases co-fed with the hydrogen to the pre-reactor prior to the feeding the residuum hydrocarbon having a reduced sulfur content to the ebullated-bed hydroconversion reactor.

2. The process of claim 1, wherein the hydroconversion catalyst fed to the pre-reactor comprises at least one of fresh and regenerated hydroconversion catalyst.

3. The process of claim 1, wherein the residuum hydrocarbon comprises at least one of petroleum atmospheric or vacuum residue, deasphalted oil, deasphalted pitch hydrocracked atmospheric tower or vacuum tower bottom, straight run vacuum gas oil, hydrocracked vacuum gas oil, fluid catalytically cracked slurry oils, vacuum gas oil from an ebullating bed process, and the at least one of a hydrotreated product and a hydrocracked product.

4. The process of claim 1, wherein the metal oxide comprises at least one element selected from Groups 4-12 of the Periodic Table of the Elements.

5. The process of claim 4, wherein the metal oxide comprises at least one of Co, Ni, W, and Mo.

6. The process of claim 1, wherein the conditions of temperature and pressure in the pre-reactor comprise a temperature in the range from about 230° C. to about 450° C. and a pressure in the range from about 1 bar absolute to about 200 bar absolute.

7. The process of claim 1, wherein the transporting comprises:
    fluidizing the pre-conditioned and at least partially sulfided hydroconversion catalyst in a transport medium; and
    conveying the fluidized catalyst and transport medium to the ebullated-bed hydroconversion reactor.

8. The process of claim 7, wherein the transport medium comprises the residuum hydrocarbon.

9. The process according to claim 1, wherein the pre-reactor comprises at least one of an ebullated bed reactor and a fixed bed reactor.

10. The process of claim 1, wherein the contacting the hydroconversion catalyst with the hydrogen and the sulfur-containing compounds comprises converting at least 30 percent of the metal oxide to a metal sulfide.

11. The process of claim 10, wherein the contacting the hydroconversion catalyst with the hydrogen and the sulfur-containing compounds comprises converting at least 50 percent of the metal oxide to a metal sulfide.

12. The process of claim 1, further comprising intermittently or continuously:
    withdrawing spent hydroconversion catalyst from the ebullated-bed hydroconversion reactor.

* * * * *